United States Patent [19]

Lehman

[11] Patent Number: 5,158,238
[45] Date of Patent: Oct. 27, 1992

[54] PROCESS AND APPARATUS FOR RECOVERY OF LEAD SHOT, BULLETS AND SLUGS FROM FIRING RANGES

[75] Inventor: Ellis Lehman, 7873 Chatham Ave., North Canton, Ohio 44720

[73] Assignee: Ellis Lehman, North Canton, Ohio

[21] Appl. No.: 751,983

[22] Filed: Aug. 29, 1991

[51] Int. Cl.[5] .............................................. B07B 1/00
[52] U.S. Cl. ........................................ 241/24; 177/1;
 177/122; 241/25; 241/75; 299/7
[58] Field of Search ...................... 241/24, 25, 60, 75, 241/79.1, 20; 299/7; 171/1, 122, 124, 132

[56] References Cited

U.S. PATENT DOCUMENTS

| 3,393,876 | 7/1968  | Elmore         | 241/20   |
|-----------|---------|----------------|----------|
| 3,647,150 | 3/1972  | Stephanek      | 241/75   |
| 4,044,956 | 8/1977  | Benedetto et al. | 241/24 |
| 4,126,673 | 11/1978 | Cromwell       | 241/24 X |
| 4,139,454 | 2/1979  | Larson         | 209/12   |
| 4,397,424 | 8/1983  | Zappa et al.   | 241/20   |
| 4,593,766 | 6/1986  | Gossard        | 171/63   |
| 4,726,530 | 2/1988  | Miller et al.  | 241/24   |
| 4,726,880 | 2/1988  | Smith          | 241/24 X |

Primary Examiner—Douglas D. Watts
Attorney, Agent, or Firm—Michael Sand Co.

[57] ABSTRACT

This invention relates to process and apparatus for recovering and cleaning lead shot, bullets and slugs of various sizes from shooting range backstops and similar sites. The process involves excavating the site material and delivering same to a surge hopper from which the material is metered substantially uniformly to a vibratory feeder. The material is delivered by the feeder to a shredder which serves to condition and de-agglomerate the material for uniform flowability and separation. The shredded material is delivered to a trommel screen for initial separation into two major fractions, returning the larger particle fraction to the excavation site and delivering the smaller particle fraction to a sizing screen. The smaller particle fraction is sized into (a) all particles larger than the finest lead shot, bullets and slugs determined as existent at the site and (b) all particles smaller than the finest lead shot, bullets and slugs, both the oversized (a) and the undersized (b) particle fractions being returned to the excavation site. The sized lead-containing fraction is delivered to a water tank wherein a slurry is created by water circulation following which the slurry is delivered to a gravity spiral separator to separate the lead-containing material from the non-lead-containing material. Both the lead-containing material and the non-lead-containing material are passed through de-watering sieves to concentrate the solids therein, the first de-watered fraction containing the recovered clean lead particles for recycling and the second de-watered fraction containing waste soil for return to the excavation site.

11 Claims, 1 Drawing Sheet

PROCESS AND APPARATUS FOR RECOVERY OF LEAD SHOT, BULLETS AND SLUGS FROM FIRING RANGES

BACKGROUND OF THE INVENTION

1. Technical Field

This invention relates to a process and apparatus for the recovery of lead shot, bullets and slugs primarily from old firing ranges, both military and commercial, as well as private shooting clubs and ranges. The lead material is recovered from old mounds of firing ranges and hillsides which serve as backstops for such ranges.

2. Background Information

Contamination of ground water by the concentrated lead deposits found in the backstops of firing ranges, including military, commercial and private, appears to be the next major item on the agenda of the U.S. Environmental Protection Agency for cleanup of the environment. A new strategic goal for the military industry is an environmental cleanup program aimed at restoring the environment and reducing pollution at thousands of military and other government military-industrial installations in the United States and abroad which have been contaminated with untold amounts of toxic substances. One of the greatest toxic substances is lead and lead alloys which have been residing in place, especially concentrated in firing ranges where lead shot, bullets and slugs have been in situ in considerable concentrations, and increasingly contaminating sources of ground water and adjacent aquifers. Very little prior art exits which is capable of providing processes and apparatus for treating such lead deposits by their collection and/or removal to prevent ground water contamination, and recovery for reuse of the lead.

Most of the known prior art relates to the recovery of lead from waste storage batteries such as disclosed in U.S. Pat. No. 3,393,876 to Elmore and U.S. Pat. No. 4,397,424 to Zappa et al. which relate to battery reclaiming methods and apparatus. Neither of the foregoing references is applicable to the recovery of lead shot, bullets and slugs from shooting range backstops wherein the lead concentration may vary very widely depending upon the previous use of the ranges, some of which date back for decades of military use and, in some cases, nearly a century.

This invention relates to the recovery of metallic lead, lead oxide and lead alloys from mounds and hillsides backing all kinds of shooting ranges from small arms fire as well as heavier arms fire where the lead projectiles have resided in both soil and rocky environments for extremely lengthy time periods. More particularly, this invention relates to the separation of the lead and lead-containing materials from the non-lead containing materials which normally consist of soil, sand, clay and rocky land which constitutes the firing range backstops. The former are commonly called the valued materials wherein the latter are non-valued materials.

The subject invention possesses increasingly greater value not only in the recovery of the lead, lead oxide and lead alloys for reuse but their elimination from soil deposits which are causing contamination of ground water in literally thousands of locations throughout the United States and abroad. The sites vary from Civil War battlefields to past and present military training bases as well as those used for competitive shooting matches such as Camp Perry in Ohio. The importance of eliminating such contaminants as lead from ground water is becoming increasingly important for protection of water sources and cleanup of sources which are increasingly being designated as contaminated by lead and other toxic substances. It is becoming increasingly important to the United States Government that both military and military-industrial installations be brought into compliance with the environmental laws. It is estimated that this military-industrial environmental project could take as long as 30 years to complete and cost 400 billion dollars, and both the Energy and Defense Departments of the U.S. Government are spending increased amounts of time and money on such projects.

SUMMARY OF THE INVENTION

This invention relates to process and apparatus for recovering and cleaning lead shot, bullets and slugs of various sizes from shooting range backstops and similar sites. The basic steps involve excavating the site material and delivering same to a surge hopper from which the material is metered from the surge hopper substantially uniformly to a vibratory feeder. The material is delivered from the feeder to a shredder which serves to condition and de-agglomerate the material for uniform flowability and separation. The shredded material is delivered to a trommel screen for initial separation into two major fractions, returning the larger particle fraction to the excavation site and delivering the smaller particle fraction to a sizing screen. The smaller particle fraction is sized into (a) all particles larger than the finest lead shot, bullets and slugs determined as existent at the site and (b) all particles smaller than the finest lead shot, bullets and slugs, both the oversized (a) and the undersized (b) particle fractions being returned to the excavation site. The sized lead-containing fraction is delivered to a water tank wherein a slurry is created by water circulation following which the slurry is delivered to a gravity spiral separator to separate the lead-containing material from the non-lead-containing material. Both the lead-containing material and the non-lead-containing material are passed through de-watering sieves to concentrate the solids therein, the first de-watered fraction containing the recovered clean lead particles for recycling and the second de-watered fraction containing waste soil for return to the excavation site.

Normally, the site material is initially analyzed to determine the naturally-occurring moisture content of the soil and the particle size distribution of the lead materials contained in such site for determining the settings of the recovery apparatus as set forth hereinabove. It has been found that it is important to fully saturate substantially all surfaces of the lead and lead oxide particles with water in the slurry-forming step prior to their delivery to the gravity spiral separator. The lead-containing material is separated from the non-lead-containing material by a combination of gravity flow, adjustable diverters and helical shape of the diverters in order to obtain the desired separation. The shredding step of the site material is achieved with rotary mechanical cutters to reduce the size of excessive organic matter, such as weeds, grasses and small trees which are found to occur naturally at the excavation sites, especially those which have not been used for substantial periods of time. The lead-containing material may subsequently be separated into two distinct fractions containing large and small lead particles. The recovered lead particles may be used as the raw material in lead and lead alloy smelting operations which in part justify the cost and use of the recovery method and apparatus.

The recovery apparatus of the process may be mounted on a flat-bed trailer for its portable movement from one site to another and to readily obtain access to various areas of the lead-containing site and may possess self-contained power-generation and water-pumping equipment to facilitate practicing the process in isolated remote areas in a most economical manner.

BRIEF DESCRIPTION OF THE DRAWINGS

The preferred embodiment of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
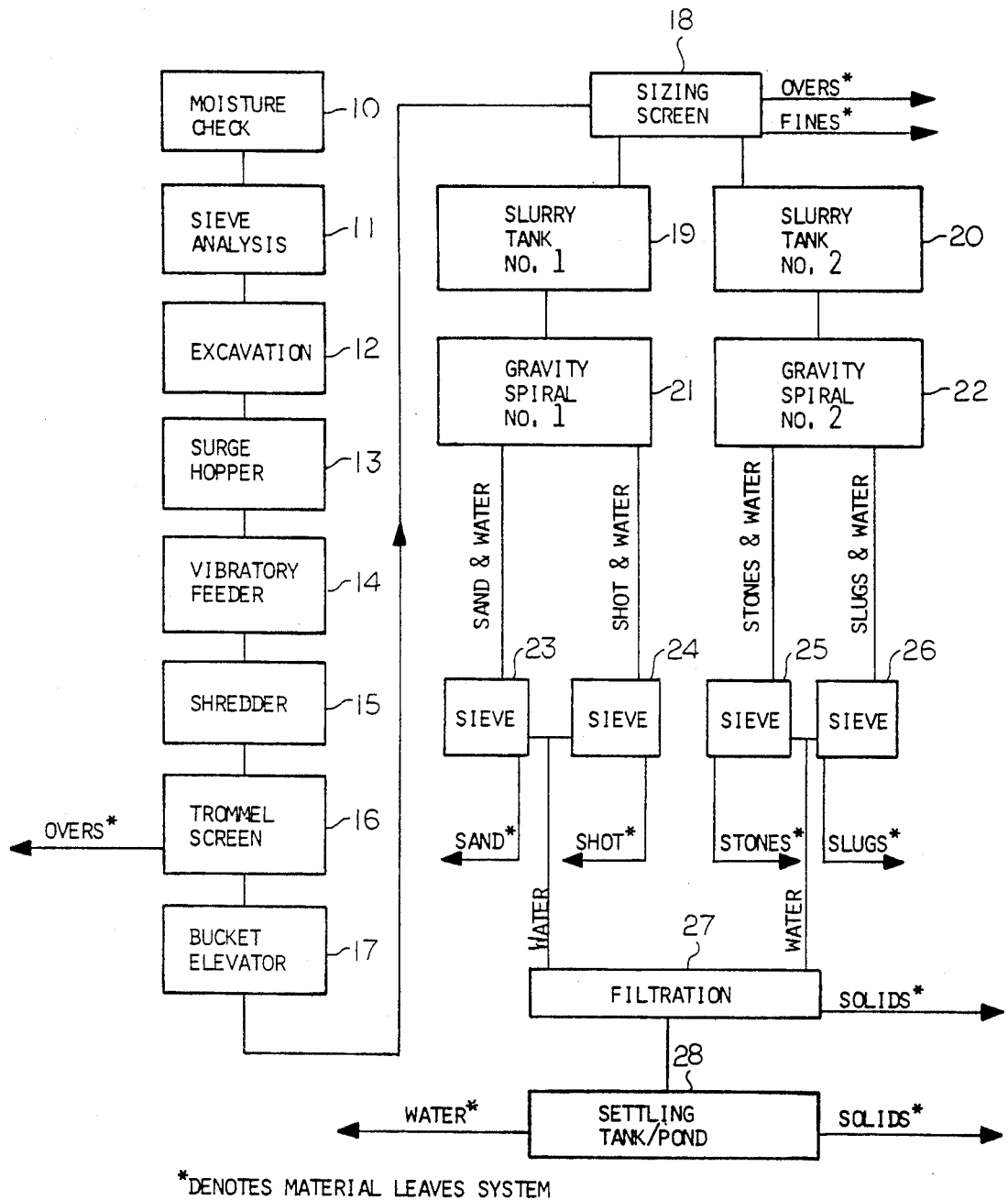
FIG. 1 is a flow chart indicating in a block diagram the major components of the apparatus for practicing the present process.

The subject invention relates generally to process and apparatus for the recovery of lead shot, bullets and slugs which reside at varying depths in an area where they are concentrated when the site has been used as a firing range backstop for lengthy periods of time measured in years and decades. The site is normally sampled to determine the particle sizes of the lead projectiles, which may vary from very fine shot of 2-50 millimeters to 100 millimeter projectiles and fragments thereof, as well as larger lead slugs and/or balls which have been fired from old style and even ancient weapons. The site is sampled to determine both the moisture content of the excavation site as well as the range of sizes of the lead, lead oxide and lead alloy projectiles, as well as fragments thereof. Such measurements are employed to establish the parameters of the process and arrange the settings of the required apparatus for practicing the process. The lead-containing material may typically vary in size from about 1/16 inch to 1 inch depending upon the history of use of the particular site.

Lead is normally insoluble in water, but slowly soluble in water containing weak acid. Thus, the lead is slowly leached into ground water where the soil is acidic. Over time, the lead particles are oxidized on their surfaces forming lead dioxide and lead hydroxide coatings which vary from white to brown to yellow in color. In older forms of lead-shot metal the shot is formed of an alloy of lead and arsenic The arsenic content may range from 0.3 to 0.8 percent and may be added either in the form of white arsenic or arsenical dross. The arsenic imparts a greater fluidity to the metal and increases the tendency of the metal to assume a spherical shape in passing through air when dropped from the top of a lead-shot tower. With too little arsenic, the drops are pear shaped and with too much arsenic the drops are double-convex in shape. Thus, the arsenic content of heavily-concentrated lead-shot sites makes removal of the lead shot doubly important.

Although the subject process may be broadly defined as somewhat similar to coal and aggregate processing, there are major differences. Coal is passed through crushers, cyclones, jigs, flotation cells, magnetic separators and utilizes either magnetite or various chemicals to enhance its cleaning. The subject process does not employ any of the aforesaid devices or chemicals. In addition, coal is not shredded as such, but in the present process, the feed stock from the excavation site is shredded to reduce the size of organic material.

Aggregate i.e. sand, gravel and limestone processing is simpler than either coal or lead recovery. Some aggregate plants only classify by size while others may crush the raw material and/or wash the aggregate such as stone; however, they do not separate the aggregate by weight.

FIG. 1 of the drawings illustrates in a flow sheet type drawing, the complete system capable of recovering either shot and/or slugs, and ultimately, discharging clean safe by-products for reuse. A lined settling pond may be utilized at the end of the process at the oldest sites where the lead has broken down to microscopic dimensions and can escape even final filtration steps.

The process and apparatus may be summarily described as follows:

1. Moisture Check—Each site, where the recovery of lead shot and/or slugs is to be carried out, is subjected to moisture checks as set forth at the numeral 10. The soil samples gathered from the site for this check are taken at different elevations and depths to determine the percentage of moisture as a range from minimum to maximum and as an average. Each sample is stored in an air-tight container, weighed, dried and weighed again. The change of weight loss indicates the percentage of moisture. Accumulated moisture percentages are recorded as relevant to overall efficiency of the process at a given site and to make any necessary adjustments to the apparatus and process in terms of flow and processing rates and overall lead recovery efficiency.

2. Sieve Analysis—Each soil sample extracted and dried for moisture check is then sifted through U.S. Standard sieve screens for a period of time sufficient that all particles capable of passing through each successively smaller aperture will have done so. This procedure designated by 11 indicates particle size distribution in terms of percentage of the lead and soil particles requiring separation. With this information, appropriate screen size openings can be selected for the various components which comprise the apparatus. This data is recorded as relevant to overall process efficiency and plant capacity.

3. Excavation—This step is carried out with conventional excavation equipment, such as wheeled loaders and hydraulic or electric shovels at the numeral 12. The physical characteristics of the soil vegetation, as well as the size, i.e. acreage of the site being cleaned, will determine the most efficient type and quantity of excavation equipment required.

4. Surge Hopper—This component designated by the numeral 13 is comprised of primarily of a large elevated steel or wood and steel box. This holding device is capable of receiving raw material from the excavator. In view of the fact that the process apparatus is required to process the material at an even or consistent rate to achieve maximum efficiency, the hopper receives surges or loads from the excavator bucket or scoop and temporarily holds such load for proper metering out of the site material.

5. Vibratory Feeder 14—As indicated, the overall efficiency of the process is largely dependent upon a consistent feed or controlled flow rate of the excavation material. By means of vibration and/or reciprocation, the feeder pan or trough precisely regulates the flow of raw material into the system, usually in terms of pounds or tons per hour. The feeder is located under the surge hopper and discharges onto a conventional conveyor belt which then elevates the soil/lead/vegetation mix to the soil shredder/conditioner.

6. Shredder 15—In the event the feed stock, i.e. raw material from the site, contains excessive organic matter, moisture, and/or clay, the shredder conditions or de-agglomerates the material with mechanical cutters or knives to facilitate flowability and separation by means of further screening. The stream then drops down to the feed end of the trommel screen.

7. Trommel Screen 16—This device consists of a cylindrical drum positioned at an angle approximately 8° from horizontal. The screen rotates between 15 to 20 revolutions per minute and has apertures extending throughout its full length and circumference of a size to allow all lead particles to pass therethrough. All material larger than the largest lead particle leaves the process system by means of a stationary chute and is returned to the excavation site by any appropriate means such as a conveyor belt or excavator. All material passing through the screen is elevated by a bucket type elevator 17 to the feed end of the sizing screen 18.

8. Sizing Screen 18—This step of the present system utilizes a sizing screen product of Midwestern Industries, Inc. termed a MULTIVIB VERTICAL SIZING SCREEN, U.S. Pat. No. 4,319,992. This machine will separate by size the following: all particles larger than lead slugs or bullets, all particles smaller than the finest lead shots and slugs from shot. At this point, the oversized and undersized materials termed "fines" are discharged out of the system and are returned to the excavation site. The lead slugs and shot are now separate fractions, although still containing soil, and are discharged into separate circuits for further cleaning. The two lead-containing circuits utilize the same components and processes and will be described the same, whether the circuit is cleaning shot or slugs. Reference is made hereinafter simply to "lead".

9. Slurry Tanks 19 and 20—The lead-laden streams discharged from the aforesaid sizing screen drop into tanks of water, which water is recirculated from the end of the system, featuring pumps and level sensors similar to sump pump arrangements. The flow rate of water in terms of gallons per minute is delivered into and out of the slurry tank which is regulated so that all particles of lead and soil are thoroughly saturated on their surfaces. This mixture is pumped up to the top or feed end of the gravity spirals.

10. Gravity Spiral Separators 21 and 22—These devices are manufactured by Mineral Deposits Limited, of Golden, Colo. and perform the critical step in the system with a combination of gravity, adjustable diverters and a helical or spiral shape. The troughs of this apparatus receive the slurry stream and separate the soil from the lead by virtue of the significant differences in specific gravity of their respective weights. The spirals discharge two streams, one containing lead and one containing soil and both containing water. Each stream continues on to separate dewatering sieves.

11. Dewatering Sieves designated by the numerals 23, 24, 25 and 26—Static sieve screens are made of closely-spaced "V" shaped stainless steel wires. These wires are attached to support bars which maintain the spacing and keep the wires parallel. The V-wires are horizontal and the support bars are generally curved. As the stream passes over the screen surface, water passes through the solids, i.e. lead or soil, and the water is discharged through the screen and the solids pass off the end of the screen. Other than total drying, the lead and soil are now cleaned and separated and leave the system. The lead fractions include one containing the smaller lead shot particles and fragments and the second containing the larger lead slugs and fragments. The water proceeds to filtration for further use.

12. Filtration 27—At this point, the process water contain substantial amounts of silt. To approach a totally enclosed circuit and maintain environmental responsibility, this silt and water must be separated. To remove the majority of the silt, the stream is pumped through a Ronningen-Petter in-line liquid filter featuring back-wash capabilities. The flow enters at the inlet or bottom port then upward, around and through the media, which is a stainless steel or fabric screen reinforced by a perforated stainless steel backing. Filtered water discharges through the outlet or top port so the soil solids can be returned to the excavation site. The water goes to a lined settling pond, tank or clarifier 28. After the solids settle, clean water is drawn off from the top and returned to the process at step 9, the slurry tanks 19 and 20. The settled solids are returned to the excavation site.

The present invention produces several end products which comprise clean lead particles varying in size from a smaller fraction to a larger fraction. The fractions may be combined as desired or recycled individually. The products are entirely free of acid residual which permit a substantial gain in smelting efficiency over prior techniques of lead recovery. The smelter is less subject to erosion due to the acid free nature of the end products having been thoroughly washed and dried.

Accordingly, the improved process and apparatus are simplified providing an effective, safe, inexpensive, and efficient lead recovery process and apparatus for practicing such process which achieve all of the enumerated objectives and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lead recovery process is practiced and apparatus utilized in such process is constructed and used in several forms, the characteristics of the construction, and the advantageous, new and useful results obtained, the new and useful structures, devices, elements, arrangements, parts and combinations, are set forth in the appended claims.

I claim:

1. The process of recovering and cleaning lead shot, bullets and slugs from shooting range backstops and similar sites comprising the steps of excavating the site material and delivering same to a surge hopper, metering the said material from said surge hopper substantially uniformly to a vibratory feeder, shredding the said material as delivered from said feeder to condition and de-agglomerate the same for uniform flowability and separation, delivering the shredded material to a trommel screen for initial separation into two major fractions, returning the larger particle fraction to the excavation site and delivering the smaller particle fraction to a sizing screen, sizing the smaller particle fraction into (a) all particles larger than the finest lead shot, bullets and slugs and (b) all particles smaller than the finest lead shot, bullets and slugs, returning the oversized (a) and undersized (b) particle fractions to the excavation site, delivering the lead-containing material to a water tank and creating a slurry therein by water circulation, delivering the slurry to a gravity spiral separator to separate the lead-containing material from the non-lead-containing material, passing both the lead-containing material and non-lead containing material separately through dewatering sieves to concentrate the solids therein, the first dewatered fraction containing the recovered clean lead particles and the second dewatered fraction containing waste soil for return to the excavation site.

2. The process in accordance with claim 1, including the steps of determining the moisture content of the site soil and sieve analysis of the lead shot, bullet and slug particle sizes contained in the site prior to subjecting the site material to the aforesaid process steps.

3. The process in accordance with claim 1, including the step of thoroughly saturating substantially all surfaces of the lead particles with water in the slurry-forming step prior to their delivery to said gravity spiral separator.

4. The process in accordance with claim 1, including the step of separating the lead-containing material from said non-lead-containing material by a combination of gravity flow, adjustable diverters and helical shape of said diverters.

5. The process in accordance with claim 1, including the step of shredding the said site material with rotary mechanical cutters to reduce in size excessive organic matter.

6. The process in accordance with claim 1, including the step of separating the lead-containing material into two fractions containing large and small lead particles for their individual separation as two fractions from non-lead-containing material.

7. The process in accordance with claim 1, including the step of elevating the shredded material from the trommel screen prior to its delivery to said sizing screen.

8. In combination, apparatus for recovering and cleaning lead shot, bullets and slugs from shooting range backstops and similar sites comprising
(a) means for excavating the lead-containing material from the said site where lead projectiles are buried,
(b) a surge hopper for receiving the lead-containing material from the said excavating means,
(c) a vibratory feeder for controlled delivery of the said excavated lead-containing material from the said surge hopper,
(d) a shredder for conditioning and de-agglomerating the said excavated material for uniform flowability and separation,
(e) a trommel screen for initial separation of said excavated material into two fractions, a lead-containing fraction and an oversized material fraction for return to the excavation site,
(f) a bucket elevator to elevate the first-sized lead-containing fraction from said trommel screen,
(g) a sizing screen capable of sizing the first-sized lead-containing material into oversized and undersized non-lead-containing fractions for return of same to the said excavation site,
(h) at least one slurry tank for forming a water slurry of the second-sized lead-containing material by water circulation,
(i) at least one gravity spiral separator to separate the lead-containing material from the non-lead-containing material by specific gravity, and
(j) at least one pair of dewatering sieves to concentrate the solids therein from the water, the first dewatered fraction containing clean lead particles for recycling recovery and the second dewatered fraction containing waste soil for return to the excavation site.

9. The combined apparatus in accordance with claim 8, wherein said shredder comprises a shredder/conditioner to mechanically sever organic material from the excavation site into chopped smaller material for uniform delivery and processing.

10. The combined apparatus in accordance with claim 8, wherein said gravity spiral separators include adjustable diverters and spiral-shaped troughs for separation of the lead-containing water slurry by specific gravity.

11. The combined apparatus in accordance with claim 8, wherein the said pair of dewatering sieves are capable of separating (a) water and sand, (b) water and stone, and (c) water and lead.

* * * * *